US008627470B2

(12) United States Patent
Krischer et al.

(10) Patent No.: US 8,627,470 B2
(45) Date of Patent: Jan. 7, 2014

(54) SYSTEM AND METHOD FOR WIRELESS NETWORK AND PHYSICAL SYSTEM INTEGRATION

(75) Inventors: Mark Krischer, Pymbie (AU); Simon King, Pennant Hills (AU)

(73) Assignee: Cisco Technology, Inc., San Jose, CA (US)

( * ) Notice: Subject to any disclaimer, the term of this patent is extended or adjusted under 35 U.S.C. 154(b) by 1820 days.

(21) Appl. No.: 11/939,355

(22) Filed: Nov. 13, 2007

(65) Prior Publication Data

US 2009/0125981 A1    May 14, 2009

(51) Int. Cl.
*G06F 11/00* (2006.01)
*G08B 23/00* (2006.01)
*G06F 17/30* (2006.01)
*G06F 15/16* (2006.01)
*H04W 24/00* (2009.01)

(52) U.S. Cl.
USPC ............... 726/23; 726/2; 709/227; 455/456.1

(58) Field of Classification Search
USPC ............... 726/22–25; 713/187–188, 193–194
See application file for complete search history.

(56) References Cited

U.S. PATENT DOCUMENTS

| | | | |
|---|---|---|---|
| 5,991,881 A * | 11/1999 | Conklin et al. ................. | 726/22 |
| 6,910,135 B1 | 6/2005 | Grainger | |
| 7,007,301 B2 | 2/2006 | Crosbie et al. | |
| 7,086,089 B2 | 8/2006 | Hrastar et al. | |
| 7,428,002 B2 | 9/2008 | Monroe | |
| 7,810,154 B2 * | 10/2010 | Hum et al. ................. | 726/22 |
| 2003/0221006 A1 | 11/2003 | Kuan et al. | |
| 2003/0232598 A1 | 12/2003 | Aljadeff et al. | |
| 2004/0198392 A1 * | 10/2004 | Harvey et al. ............. | 455/456.1 |
| 2005/0030929 A1 | 2/2005 | Swier et al. | |
| 2006/0070113 A1 * | 3/2006 | Bhagwat et al. ................. | 726/2 |
| 2007/0094741 A1 | 4/2007 | Lynn et al. | |
| 2007/0132846 A1 * | 6/2007 | Broad et al. ................. | 348/143 |

FOREIGN PATENT DOCUMENTS

| | | |
|---|---|---|
| WO | WO2005041040 A | 5/2005 |
| WO | WO2005046254 A | 5/2005 |
| WO | WO2007127556 A | 11/2007 |
| WO | WO 2007127556 A1 * | 11/2007 |

OTHER PUBLICATIONS

International Searching Authority, PCT International Search Report and Written Opinion, Feb. 23, 2009.

* cited by examiner

*Primary Examiner* — Evans Desrosiers
(74) *Attorney, Agent, or Firm* — P. Su

(57) ABSTRACT

In one embodiment, an apparatus includes an intrusion detection arrangement and a location identification arrangement. The intrusion detection arrangement determines when a client without authorization attempts to access a wireless network of which the intrusion detection arrangement is a part. The location identification arrangement identifies at least a first approximate physical location of the client without authorization when the client without authorization attempts to access the wireless network. The location identification arrangement is configured to communicate the first approximate physical location to a surveillance arrangement which monitors the first approximate physical location.

20 Claims, 7 Drawing Sheets

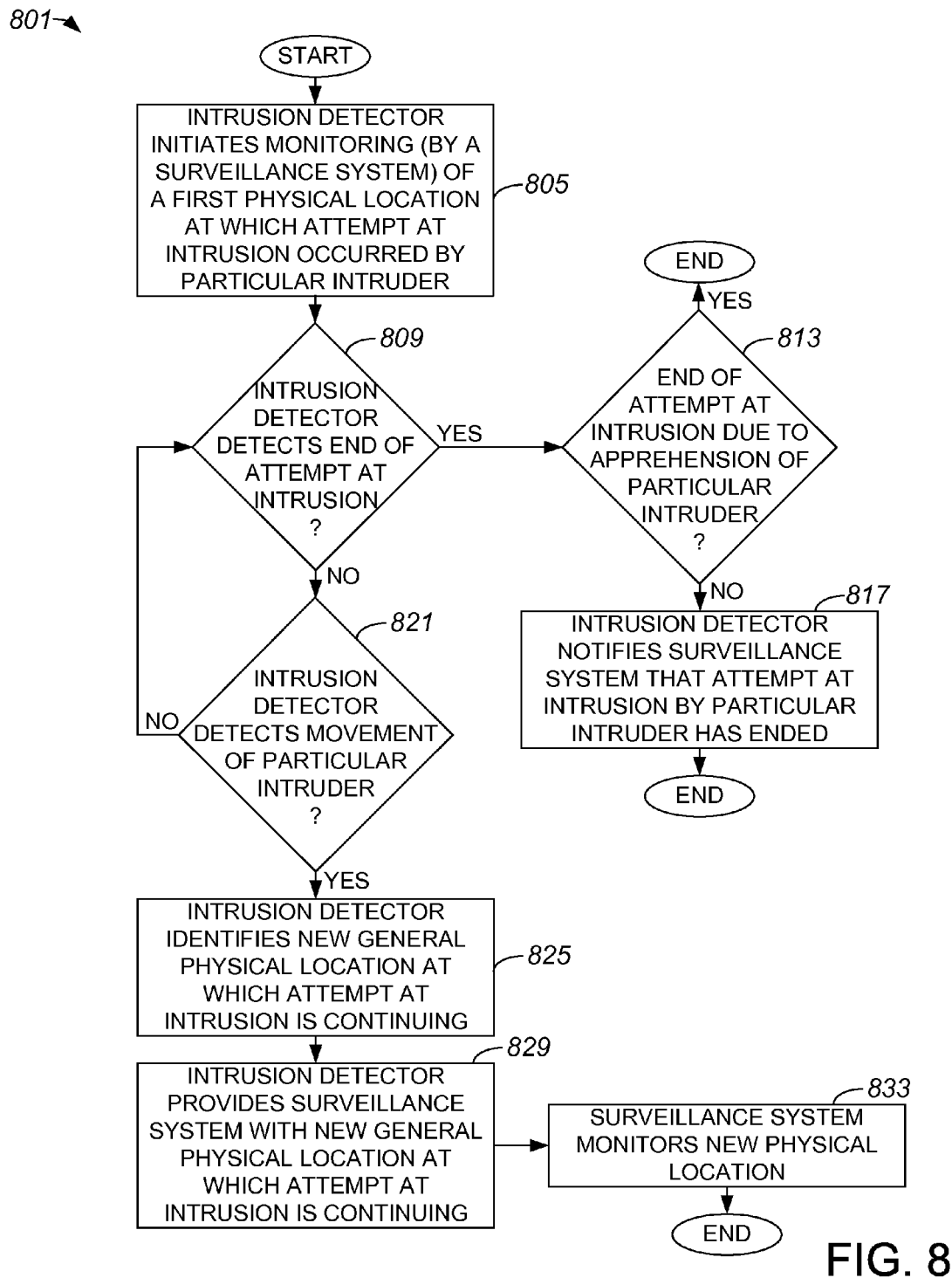

US 8,627,470 B2

SYSTEM AND METHOD FOR WIRELESS NETWORK AND PHYSICAL SYSTEM INTEGRATION

BACKGROUND OF THE INVENTION

Networks are often subject to attacks by intruders who wish to gain unauthorized access to resources of the networks. By way of example, attackers that are in proximity to a wireless network may attempt to hack into the wireless network in order to gain access to an internal network, or to gain free Internet access. Protecting network infrastructure and corporate data from external attackers is a primary concern for network administrators.

BRIEF DESCRIPTION OF THE DRAWINGS

The present invention will be readily understood by the following detailed description in conjunction with the accompanying drawings, wherein like reference numerals designate like structural elements, and in which:

FIG. 8 is a process flow diagram which illustrates a method of operating an overall system in which a joint network and physical perimeter defense are implemented that includes updating information provided to a video surveillance system when an intruder moves in accordance with an embodiment of the present invention.

DESCRIPTION OF EXAMPLE EMBODIMENTS

General Overview

Figure 1:
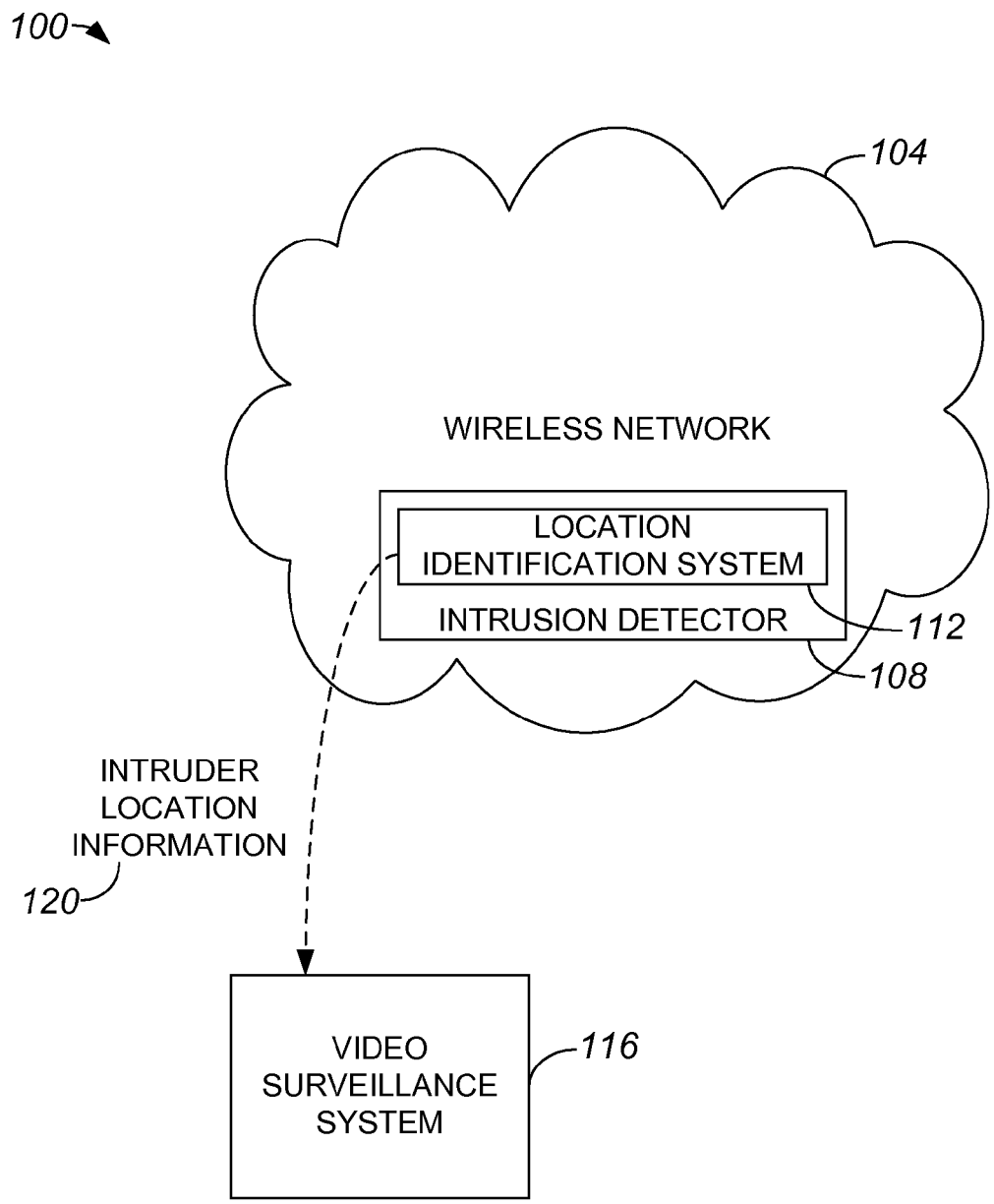
FIG. 1 is a diagrammatic representation of an overall system in which a wireless network is arranged to detect wireless intrusion attempts and to provide information regarding the location of the wireless attackers to a surveillance system in accordance with an embodiment of the present invention.

According to one aspect of the present invention, an apparatus includes a wireless intrusion detection arrangement and a location identification arrangement. The intrusion detection arrangement determines when an attacker without authorization attempts to access a wireless network of which the intrusion detection arrangement is a part. The location identification arrangement identifies at least a first approximate physical location of the attacker when the attacker attempts to access the wireless network. The location identification arrangement is configured to communicate the first approximate physical location to a surveillance arrangement which monitors the first approximate physical location.

Description

Attacks on a network, e.g., unauthorized intrusions into a private wireless network, compromise the security of the network. The ability to efficiently react to such attacks allows forensic data associated with the attacks to be collected in a timely manner, and increases the likelihood that any damage caused by the attacks is effectively minimized. Further, the likelihood that attackers may effectively be caught and prosecuted may be increased with the ability to efficiently react to attacks.

Allowing intruders that attempt to access a network through a wireless interface to be identified, measures may be taken to terminate attempts to access the network. Determining at least an approximate physical or actual location at which a wireless attacker or intruder is located effectively narrows down a search area that may be searched to physically apprehend the wireless attacker or intruder. In one embodiment, a location appliance that is arranged to determine the approximate actual location of an attacker may feed or otherwise provide information pertaining to the approximate actual location to a video surveillance system. Once the video surveillance system obtains the information pertaining to the approximate actual location from the location appliance, the video surveillance system may identify appropriate cameras to provide coverage of the approximate actual location, and may move the cameras as appropriate to cover the approximate actual location.

A location appliance that is a part of a network which may be accessed wirelessly may provide an approximate location of an intruder or rogue access point, e.g., a computing device such as an access point that does not have authorization to access the network or a computing device operated by an individual who is not authorized to access the network, to a surveillance system to enable the surveillance system to be used to physically locate the intruder. A rogue access point may be substantially any unauthorized device that has been placed on a network by a physical intruder such that he/she may provide himself/herself with external backdoor access to the network, or to provide a trap for legitimate users. Upon physically locating an intruder, steps may be taken to effectively apprehend the intruder and to protect the security of the network. Effectively apprehending the intruder may include, but is not limited to including, taking a computing device offline and/or implementing disciplinary actions against an individual associated with the intruder.

Referring initially to FIG. 1, an overall system in which a network with a wireless interface is arranged to detect wireless attackers and to provide information regarding the location of the wireless attackers to a surveillance system will be described in accordance with an embodiment of the present invention. An overall system 100 includes a wireless network 104 and a surveillance system 116. Wireless network 104 may include components that communicate both wirelessly and in a wired manner. That is, wireless network 104 is not limited to strictly supporting wireless communications, and may also support wired communications. Surveillance system 116 may be substantially any system that observes and/or collects information. In one embodiment, surveillance system 116 is a video surveillance system which includes video cameras configured to closely and continually monitor physical zones.

Included in wireless network 104 is an intrusion detector 108 which is arranged to detect unauthorized attempts to access wireless network 104. That is, intrusion detector 108 identifies intruders or rogue access points that attempt to gain access to or to otherwise infiltrate wireless network 104. It should be appreciated that intrusion detector 108 may utilize Open Systems Interconnection (OSI) layer 2 wireless intrusion detection and prevention mechanisms that cooperate with OSI layer 3 through layer 7 wired intrusion detection and prevention mechanisms. In other words, a layer 2 wireless local area network (WLAN) intrusion detection/prevention system (WIDS) may be substantially integrated with intrusion detection/prevention systems (IDSs) associated with layers 3 through layers 7. Information used to detect attacks need not be focused solely on attacks against a wireless LAN, namely layer 2, but may also be utilized to detect higher layer attacks, as for example attacks on layer 3 through layer 7. The layer 2 identity of an attacker, e.g., a wireless adapter media access control (MAC) address, may be traced back from other layers.

In one embodiment, intrusion detector 108 includes a location identification system 112 that is arranged to provide a general location of any intruders or wireless attackers detected by intrusion detector 108. Location identification system 112 is arranged to collect information that allows an approximate physical location of an attacking intruder that is attempting to access wireless network 104. That is, location identification system 112 is arranged to generate intruder location information 120. Location identification system 112 is also arranged to provide intruder location information 120 to video surveillance system 116, which is generally arranged to process intruder location information 120 in order to provide surveillance of the area around the approximate physical location of the attacking intruder.

Figure 2:
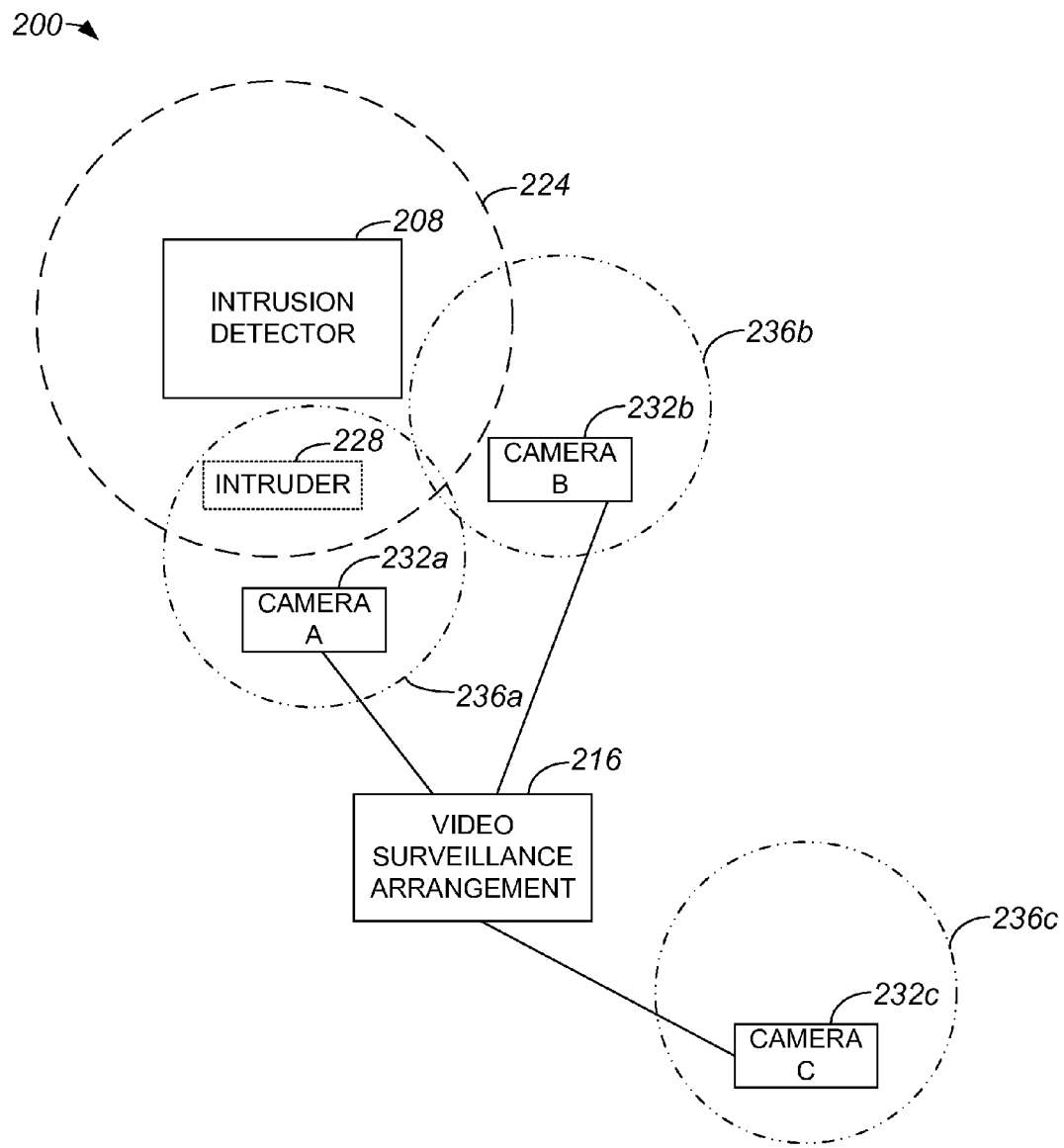
FIG. 2 is a diagrammatic representation of an overall system in which a range covered by an intrusion detector is covered by a camera associated with a video surveillance arrangement in accordance with an embodiment of the present invention.

Within video surveillance arrangement 116, any number of video cameras (not shown) or other surveillance devices (not shown) may be used to cover the approximate physical location of the attacking intruder. Each video camera or surveillance device within video surveillance arrangement 116 may be arranged to cover an associated zone. FIG. 2 is a diagrammatic representation of an overall system in which a range covered by an intrusion detector is covered by a camera associated with a video surveillance arrangement in accordance with an embodiment of the present invention. An overall system 200 includes an intrusion detector 208 that is associated with a wireless network (not shown) and a video surveillance arrangement 216 with which intrusion detector 208 is arranged to communicate, e.g., wirelessly.

Intrusion detector 208 is configured to detect any intruders, as for example intruder 228, which enter into a range 224. Range 224 is a physical area within which intrusion detector 208 is capable of determining locations of intruders. That is, intrusion detector 208 is arranged to identify the approximate physical locations of any intruder that enters into a physical area or range 224.

Video surveillance arrangement 216 includes cameras 232a-c that each have a coverage zone 236a-c, respectively. By way of example, camera 232a is arranged to cover a zone 236a such that zone 236a may be monitored by substantially anyone viewing a display of images provided by camera 232a. Zones 236a-c may either be non-overlapping, or may at least partially overlap each other, as in the case of zones 236a, 236b. In the embodiment as shown, range 224 is covered by at least two zones 236a, 236b. However, it should be appreciated that range 224 may be covered by substantially only a single zone, as for example when a zone associated with a camera is substantially coincident with range 224.

After intrusion detector 208 detects that intruder 228 is at least partially within range 224, intrusion detector identifies an approximate physical location of intruder 228. Intrusion detector 208 provides information relating to the approximate physical location of intruder 228 to video surveillance arrangement 216. Using the information, video surveillance arrangement 216 may determine which of cameras 232a-c has an associated zone 236a-c, respectively, that encompasses the approximate physical location of intruder 228. As shown, camera 232a has a zone 236a that covers the approximate physical location of intruder 228. Hence, video surveillance arrangement 216 may effectively arrange for camera 232a to be used to visually locate intruder 228. A video surveillance arrangement 216 may pull up a camera image with a notice which indicates that a potential network intrusion has been detected, and security personnel may then manually move a camera in an appropriate area to detect suspicious individuals or activity.

In one embodiment, as intruder 228 is in zone 236a and in relatively close proximity to zone 236b, video surveillance arrangement 216 may designate both camera 232a and camera 232b for use in visually locating intruder 228. Designating both cameras 232a, 232b may account for any slight errors in approximating the physical location of intruder 228 within range 224.

Figure 3:
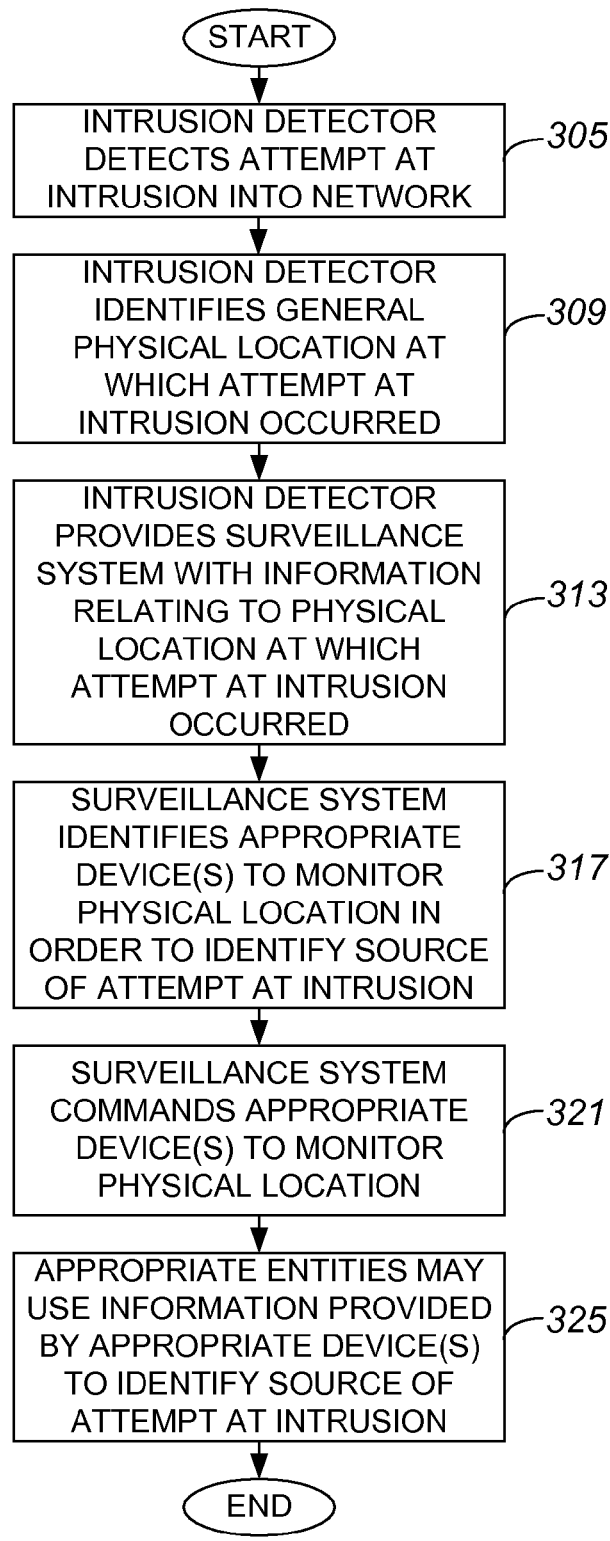
FIG. 3 is a process flow diagram which illustrates a first method of operating an overall system in which a joint network and physical perimeter defense are implemented in accordance with an embodiment of the present invention.

With reference to FIG. 3, a method of operating an overall system that integrates a network intrusion detector and a video surveillance system will be described in accordance with an embodiment of the present invention. A process 301 of operating an overall system that integrates network intrusion detection with physical surveillance begins at step 305 in which an intrusion detect detects an attempt at an intrusion, e.g., an unauthorized access, into a network such as a private WLAN. The intrusion may be detected, for example, when a device which is not registered with a network is identified by the network as attempting to access resources of the network.

After the attempt at intrusion into the network is detected, the intrusion detector identifies the general physical location at which the attempted intrusion occurred in step 309. Identifying the general physical location at which the attempted intrusion occurred may include, for example, identifying the nearest gateway or access point to the attempted intrusion. In general, the intrusion detector is aware of the actual location of gateways within the network. As such, identifying the nearest gateway or other suitable network appliance to the attempted intrusion effectively enables the general actual location of the attempted intrusion to be identified. The general physical or actual location may be, but is not limited to being, a building, a floor in a building, an area in a building, a room in a building, or a location that is identified by mapping coordinates such as global positioning coordinates.

Once the general physical location is identified, the intrusion detector provides a surveillance system, e.g., a video surveillance system, in step 313 with information relating to the physical location identified in step 309. The intrusion detector may, in one embodiment, form and send a message to the surveillance system that indicates that an attempted intrusion has occurred at the physical location. It should be appreciated that if there are multiple surveillance systems which are in communication with the intrusion detector, providing a surveillance system with information relating to a physical location at which an attempted intrusion has occurred may include first determining which surveillance system to provide the information to. In other words, an appropriate surveillance system may first be identified if different surveillance systems cover different physical locations.

Upon receiving the information relating to the physical location at which the attempted intrusion occurred, the surveillance system may identify a suitable device or devices to use to monitor the physical location in step 317. Typically, a suitable device may be a video camera or similar sensing device with a coverage range that encompasses the physical location at which the attempted intrusion occurred. One method of a surveillance system identifying a suitable device to use to monitor the physical location will be discussed below with reference to FIG. 4.

In step 321, the surveillance system commands the appropriate device or devices, e.g., a video camera with a viewing range that covers the physical location, to monitor the physical location. From step 321, process flow proceeds to step 325 in which appropriate entities may obtain and use information provided by the appropriate device or devices to identify the source of the attempted intrusion. The appropriate entities may be security personnel or information technology administrators who view displays of the outputs of cameras that pan over the physical location. Identifying the source of the attempted intrusion may include identifying an individual operating a wireless access device using images obtained from the cameras. After the appropriate entities may obtain and use information provided by appropriate surveillance devices, the process of operating an overall system that integrates network intrusion detection with physical surveillance is completed.

Figure 4:
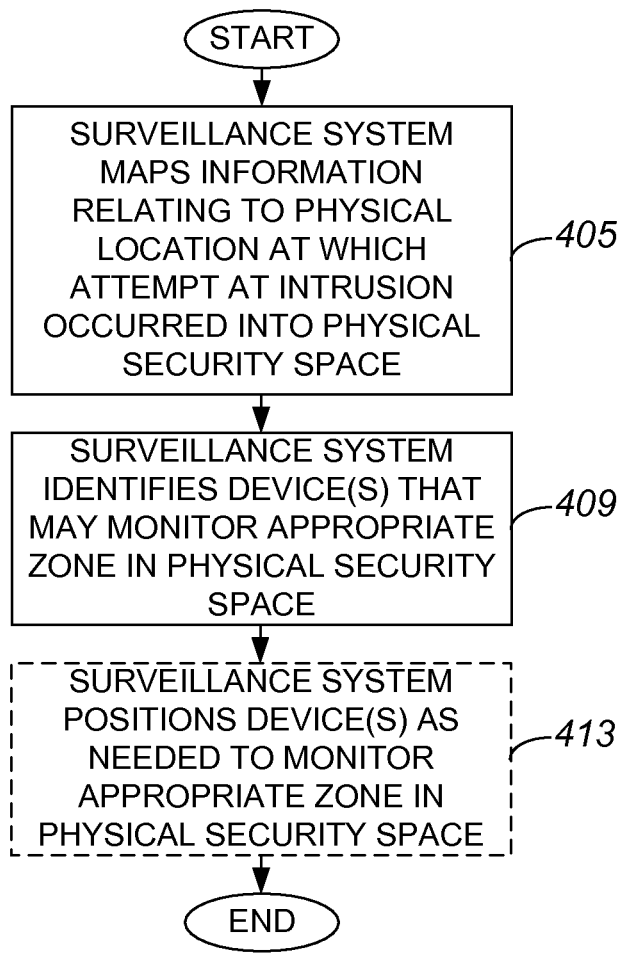
FIG. 4 is a process flow diagram which illustrates a method of enabling a video surveillance system to select at least one appropriate device to use for monitoring a particular physical location at which an intruder is attempting to access a wireless network, e.g., step 317 of FIG. 3, in accordance with an embodiment of the present invention.

Referring next to FIG. 4, a method of enabling a video surveillance system to select at least one appropriate device to use for monitoring a particular physical location at which an intruder is attempting to access a wireless network, e.g., step 317 of FIG. 3, will be described in accordance with an embodiment of the present invention. A process 317 of selecting at least one appropriate device for use in monitoring a particular physical location begins at step 405 in which the surveillance system maps information relating to the physical location at which the attempted intrusion occurred into the physical security space associated with the surveillance system. A physical location provided by an intrusion detector may be mapped into coordinates or a location that is effectively understood by the surveillance system. By way of example, an intrusion detector may indicate that an attempted intrusion is occurring in a particular area of a building that is defined with respect to the intrusion detector, and a surveillance system may map the particular area of the building into a zone that is defined within the surveillance system.

After the surveillance system maps the information obtained from the intrusion detector, the surveillance system identifies the device or devices that may be suitable for monitoring the appropriate zone in the physical security space in step 409. In other words, the surveillance system determines which device or devices are arranged to monitor the zone within which the attempted intrusion has occurred. Optionally, in step 413, the surveillance system positions the device or devices as needed to monitor the appropriate zone in the physical security space. For example, a video surveillance system may position a moveable video camera to focus on capturing images from the appropriate zone in the physical security space. The process of selecting at least one appropriate device for use in monitoring a particular physical location is completed after the devices are identified and, if necessary, positioned as needed.

Figure 5:
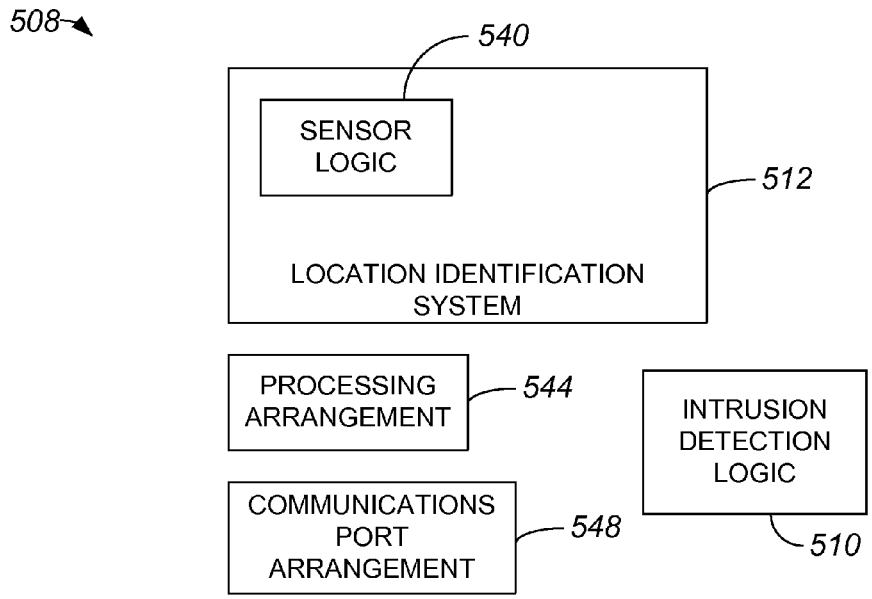
FIG. 5 is a block diagram representation of an intrusion detector in accordance with an embodiment of the present invention.

As previously mentioned, an intrusion detector includes a location identification system. In general, an intrusion detector may include a variety of different components. FIG. 5 is a block diagram representation of an intrusion detector in accordance with an embodiment of the present invention. An intrusion detector 508 includes intrusion detection logic 510 that, when executed, is arranged to determine when a rogue client or attacking intruder is within a physical range covered by intrusion detector 508. Intrusion detector 508 also includes a location identification system 512, or logic that allows at least an approximate current physical location of an attacking intruder to be determined and provided to a surveillance system (not shown). In general, logic may include hardware logic and/or software logic embodied on a tangible media such as a memory device.

Location identification system 512 includes sensor logic 540 that may be arranged to effectively sense the physical location of a wireless attacker or attacking intruder. A processing arrangement 544 is typically configured to execute any software logic or computer code devices associated with location identification system 512 and intrusion detection logic 510. Processing arrangement 544 may include at least one processor, and at least one controller.

Intrusion detector 508 includes a communications port arrangement 548, which may include a communications port through which wireless communications may occur. It should be appreciated that communications port arrangement 548 may instead include a communications port through which wired communications may occur. Communications that occur using communications port arrangement 548 include communications with a surveillance system (not shown) and communications with devices associated with a wireless network of which intrusion detector 508 is a part.

Figure 6:
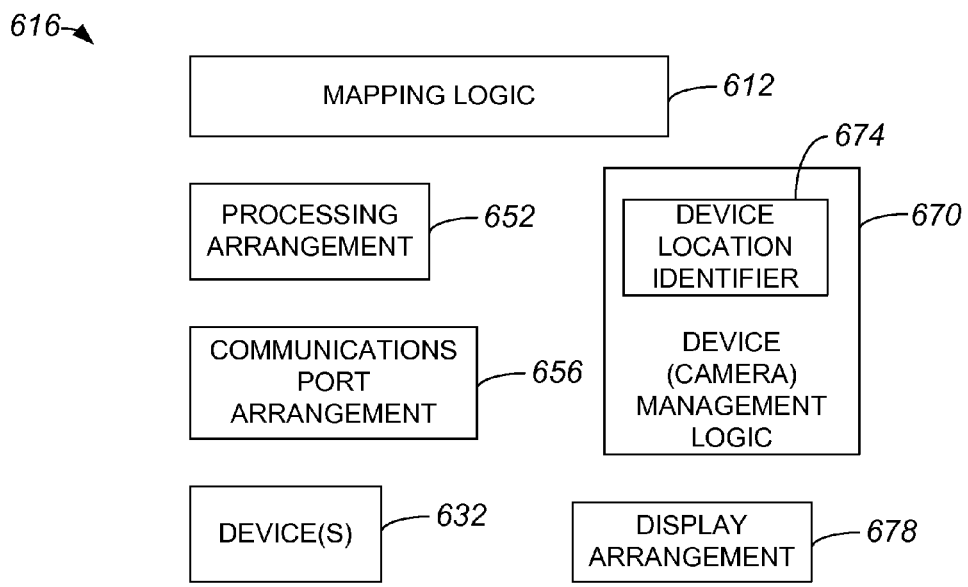
FIG. 6 is a block diagram representation of a video surveillance system in accordance with an embodiment of the present invention.

Typically, a surveillance system that cooperates with an intrusion detector in a wireless network to allow clients to be physically tracked is a video surveillance system. FIG. 6 is a block diagram representation of a video surveillance system in accordance with an embodiment of the present invention. A video surveillance system 616 includes a communications port arrangement 656 over which video surveillance system 616 may receive information from an intrusion detector such as intrusion detector 508 of FIG. 5.

Video surveillance system 616 also includes at least one device 632 to is arranged to provide surveillance. Device 632 may be a video camera that is arranged to capture and record images associated with a zone that is monitored by device 632. Device management logic 670 includes software and/or hardware logic that, when executed by a processing arrangement 652, is operable to select an appropriate device 632 for use in monitoring an approximate physical location of a wireless attacker. A device location identifier 674 included in device management logic 670 is arranged to identify the device locations, and to allow for the selection of an appropriate device 632 to use in tracking a wireless client.

Device management logic 670 also controls the operation of device 632. By way of example, device management logic 670 may be configured to position device 632 to substantially optimize the view of the vicinity an approximate physical location of a wireless attacker.

Mapping logic 612 includes software and/or hardware logic that is configured to map or otherwise transform information relating to an approximate physical location of a wireless attacker as obtained from an intrusion detector (not shown) into a physical space, i.e., a physical location that is essentially understood within the domain of video surveillance system 616. By way of example, mapping logic 612 may be arranged to provide camera and zoom coordinates that enable the approximate physical location of a wireless attacker to essentially be zeroed in upon. Mapping logic 612 may provide data that is used by device management logic 670 to control the selection of and the positioning of device 632.

Video surveillance system 616 also includes a display arrangement 678 that allows video captured by device 632 to be displayed, e.g., for the benefit IT administrators and/or security personnel. The configuration of display arrangement 678 may vary widely, and may include any number of screens or windows. Display arrangement 678 may include a graphical user interface which enables users to select views from device 632 to display, and may also allow a user to zoom devices 632 to provide more detailed views. Display arrangement 678 may display a window that identifies a particular view as being a view of an approximate physical location at which an attacking intruder is located. That is, display arrangement 678 may be arranged to clearly indicate that the presence of a wireless client is to be monitored, and that a particular view is intended to be used to facilitate the tracing or tracking of the wireless client.

Figure 7:
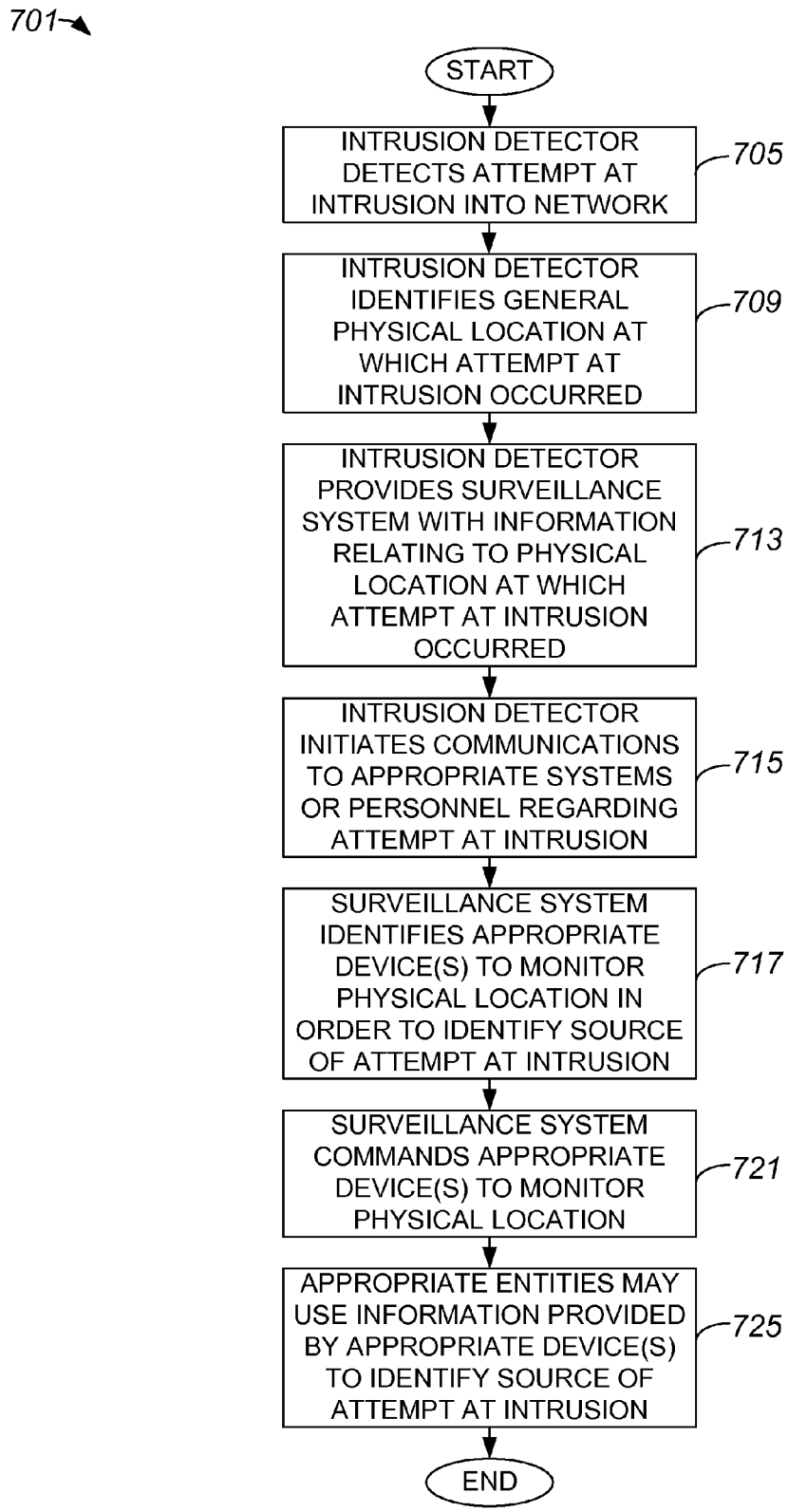
FIG. 7 is a process flow diagram which illustrates a method of operating an overall system in which a joint network and physical perimeter defense are implemented that includes notifying a plurality of systems in accordance with an embodiment of the present invention.

In some embodiments, information obtained by an intrusion detector may be shared with systems other than a surveillance system. By way of example, information associated with the general physical location of an intruder or a wireless client may be provided to an interoperability and collaboration system such as the Cisco Internet Protocol (IP) Interoperability and Collaboration system (IPICS) available from Cisco Systems, Inc., of San Jose, Calif. FIG. 7 is a process flow diagram which illustrates a method of operating an overall system in which a joint network and physical perimeter defense are implemented that includes notifying a plurality of systems in accordance with an embodiment of the present invention. A process 701 of operating an overall system that allows information relating to an intrusion into a network to be shared with various systems begins at step 705 in which an intrusion detect detects an attempt at an intrusion.

In step 709, the intrusion detector identifies the general or approximate physical location at which the attempted intrusion occurred. Once the general physical location is identified, the intrusion detector provides a surveillance system, e.g., a video surveillance system, in step 713 with information relating to the general or approximate physical location at which the attempted intrusion occurred.

After the intrusion detector provides the surveillance system with information relating to the general physical location at which the attempted intrusion occurred, the intrusion detector initiates communications in step 715 with appropriate systems or personnel regarding the attempted intrusion. The intrusion detector may send a message either directly or indirectly to an interoperability and collaboration system, for example, that indicates that there is a potential security breach at the general physical location identified in step 709. Alternatively, in one embodiment, initiating communications with appropriate systems or personnel may include providing a notification to appropriate personnel that he or she should investigate a potential security breach at the general physical location. The communications may include voice and/or video calls to IT administrators or other personnel associated with the network and the surveillance system. It should be appreciated that although the intrusion detector is described as initiating communications with appropriate systems or personnel regarding an attempted intrusion, such communications may instead be initiated by the surveillance system.

Once the surveillance system receives information relating to the general physical location at which the attempted intrusion occurred, the surveillance system may identify an appropriate device or devices to use to monitor the physical location in step 717. One suitable method of identifying an appropriate device to use to monitor the physical location was discussed above with respect to FIG. 4.

The surveillance system commands the appropriate device or devices, e.g., a camera with a viewing range that spans the physical location, in step 721 to monitor the physical location. In step 725, appropriate entities may obtain and use information provided by the appropriate device or devices to identify the source of the attempted intrusion. After the appropriate entities may obtain and use information provided by appropriate surveillance devices, the process of operating an overall system that allows information relating to an intrusion into a network to be shared with various systems.

An intruder who is attempting to access, or otherwise hack into, a wireless network using a wireless device may move around while attempting to access the wireless network. An intrusion detector may detect or otherwise determine that a particular intruder who is attempting to access a network has moved from one location to another, and notify a surveillance system of the move. FIG. 8 is a process flow diagram which illustrates a method of operating an overall system in which a joint network and physical perimeter defense are implemented that includes updating information provided to a video surveillance system when an intruder moves in accordance with an embodiment of the present invention. A process 801 of operating an overall system that includes updating location information begins at step 805 in which an intrusion detector initiates the monitoring of a first physical location at which an attempted intrusion into a network by a particular intruder has occurred. The monitoring that is initiated is effectively carried out by a surveillance system when the surveillance system receives information that the intrusion detector has detected an attempted intrusion as described above, for example, with respect to FIGS. 3 and 7.

In step 809, the intrusion detector determines whether an end of an attempted intrusion into the network by the particular intruder has been detected. Determining whether an end of an attempted intrusion has been detected may include identifying whether an address or identifier associated with a particular intruder is no longer logged by the intrusion detector as attempting to access the network, and/or identifying whether notification has been received by intrusion detector that entities, e.g., security personnel, utilizing the surveillance system have stopped particular intruder.

If the determination in step 809 is that the intrusion detector has detected an end of an attempted intrusion, then process flow proceeds to step 813 in which it is determined by the intrusion detector whether the end of the attempted intrusion was due to the apprehension of the particular intruder. In one embodiment, upon the apprehension of an intruder, appropriate personnel or authorities may provide a notification to the intrusion detector, as for example through an IT administrator, that the intruder has been stopped. If it is determined in step 813 that the end of the attempted intrusion was due to the apprehension of the particular intruder, the process of operating the overall system is completed. Alternatively, if it is determined that the end of the attempted intrusion was not a result of the particular intruder being apprehended, the indication is that the particular intruder has aborted the attempt at intrusion and/or moved out of the range of the intrusion detector. Accordingly, process flow moves to step 817 in which the intrusion detector notifies the surveillance system that the attempted intrusion by the particular intruder has ended, and the process of operating the overall system is completed. It should be appreciated that the notification may be provided to the surveillance system using any suitable method including, but not limited to including, transmitting a message to the surveillance system that identifies the first physical location as no longer needing to be monitored for the particular intruder.

Returning to step 809, if the determination is that no end to the attempted intrusion has been detected, then it is determined in step 821 whether the intrusion detector has detected movement of the particular intruder. That is, it is determined in step 821 whether the particular intruder has moved from the first physical location to a different physical location. Such movement may be identified, for example, if the particular intruder is identified as attempting to access the network through a different gateway or access point. In the described embodiment, the different physical location is within the range covered by the intrusion detector. If it is determined that no movement of the particular intruder has been detected, process flow returns to step 809 and the determination of whether the intrusion detector has detected and end of the attempted intrusion.

Alternatively, if it is determined in step 821 that the intrusion detector has detected the movement of the particular intruder, the intrusion detector identifies a new general physical location in step 825 at which the attempt at intrusion is continuing. The intrusion detector may effectively poll gateways or access points within the network to identify the gateway or access point which logs the particular intruder as attempting to access the network.

Once the new general physical location is identified, the intrusion detector provides the surveillance system with the new general physical location at which the attempted intrusion is ongoing in step 829. Then, in step 833, the surveillance system monitors the new physical location. Monitoring the new physical location typically includes identifying at least one device with a coverage range that encompasses the new physical location, and often includes mapping the information regarding the new physical location provided by the intrusion detector to a format that may be used by the surveillance system to select an appropriate device. The process of operating the overall system is completed after the surveillance system monitors the new physical location.

Although only a few embodiments of the present invention have been described, it should be understood that the present invention may be embodied in many other specific forms without departing from the spirit or the scope of the present invention. By way of example, while a surveillance system has been described as including video cameras or sensors, a surveillance system may be any suitable surveillance system. A surveillance system may generally include substantially any security camera systems and closed-circuit television systems. Security camera systems may include cameras which take still photographs.

In one embodiment, an intrusion detector and/or a surveillance system may process attempts at intrusion in the same manner irregardless of whether the attempts at intrusion are successful or unsuccessful. That is, substantially all detected attempts at intruding into a network may be processed in the same manner. However, some systems may process successful attempts differently than unsuccessful attempts. An intrusion detector may identify an actual successful attempt to intrude into a network, i.e., an actual intrusion, instead of an attempted intrusion, and indicate to the surveillance system and/or another suitable system that there is an actual intrusion into the network. Security personnel may then, for instance, respond to an actual successful attempt at intrusion with more urgency than attempts at intrusion that have not yet been successful.

It should be appreciated that an approximate physical location of an intruder or wireless attacker may fall within zones associated with more than one surveillance device. For instance, more than one video camera may cover an area identified as the likely location of an intruder. If more than one surveillance device may be used to monitor a particular physical location, either a plurality of surveillance devices may be designated to monitor the particular physical location, or one particular device may be selected to monitor the particular physical location. In the event that substantially only one particular surveillance device of a plurality of surveillance devices is to be used to monitor the particular physical location, the selection of which surveillance device to use may be based on any suitable factor. Suitable factors may include, but are not limited to including, the proximity of a given surveillance device to a particular physical location, the viewing angles available to a given surveillance device, the bandwidth associated with a given surveillance device, and the resolution associated with a given surveillance device.

The steps associated with the methods of the present invention may vary widely. Steps may be added, removed, altered, combined, and reordered without departing from the spirit of the scope of the present invention. For example, in an embodiment in which an intrusion detector may provide location information to a plurality of surveillance systems, updating location information may include notifying one surveillance system to stop monitoring a first location and notifying another surveillance system to begin monitoring a second location when a potential intruder has moved from the first location to the second location. Therefore, the present examples are to be considered as illustrative and not restrictive, and the invention is not to be limited to the details given herein, but may be modified within the scope of the appended claims.

What is claimed is:

1. An apparatus comprising:

an intrusion detection arrangement embodied on a tangible, non-transitory computer-readable medium, the intrusion detection arrangement being arranged to determine when a client without authorization attempts to access a wireless network, wherein the intrusion detection arrangement is associated with the wireless network; and a location identification arrangement embodied on the tangible, non-transitory computer-readable medium, the location identification arrangement being arranged to identify at least a first approximate physical location of the client without authorization when the client without authorization attempts to access the wireless network, wherein the location identification arrangement is arranged to transform information obtained from the intrusion detection arrangement into the first approximately physical location and to identify a surveillance system to monitor the first approximately physical location from a plurality of potential surveillance systems, and wherein the location identification arrangement is configured to communicate the first approximate physical location to the surveillance arrangement that is arranged to monitor the first approximate physical location, and wherein the location identification arrangement is further configured to determine if the client without authorization has moved and, if the client without authorization has moved, the location identification arrangement is still further configured to identify a second approximate physical location of the client without authorization and to communicate information associated with the second approximate physical location to the surveillance arrangement.

2. The apparatus of claim 1 further including: communicate the first approximate physical location to the surveillance device by sending the first approximate physical location over the port arrangement.

3. The apparatus of claim 1 wherein the location identification arrangement is further configured to communicate the first approximate physical location to an Internet Protocol interoperability and collaboration system.

4. The apparatus of claim 1 wherein the intrusion detection arrangement has an associated physical range, wherein the intrusion detection arrangement is arranged to determine when the client without authorization attempts to access the wireless network by determining when the client without authorization is present in the associated physical range.

5. A method comprising:
  determining when a client device attempts to gain unauthorized access to a wireless network;
  identifying a first approximate physical location at which the client device is located if it is determined that the client device attempts to gain unauthorized access to the wireless network;
  providing information associated with the first approximate physical location to a surveillance system, wherein the surveillance system is configured to observe at least the first approximate physical location;
  determining if the client device continues to be located at the first approximate physical location, wherein determining if the client device continues to be located at the first approximate physical location includes determining if the client device changes from attempting to gain unauthorized access to the wireless network through a first access point to attempting to gain unauthorized access to the wireless network through a second access point;
  identifying a second approximate physical location at which the client device is located if it is determined that the client device does not continue to be located at the first approximate physical location; and
  providing information associated with the second approximate physical location to the surveillance system, wherein the surveillance system is configured to observe at least the second approximate physical location.

6. The method of claim 5 further including:
  observing at least the first approximate physical location using the surveillance system after the information associated with the first approximate physical location is provided to the surveillance system.

7. The method of claim 6 wherein the surveillance system includes a plurality of monitoring devices and the method further includes:
  identifying a first monitoring device of the plurality of monitoring devices as being suitable for observing the first approximate physical location.

8. The method of claim 5 further including:
  determining if the client device has ceased attempting to gain the unauthorized access to the wireless network; and
  providing an indication to the surveillance system that the client device has ceased attempting to gain the unauthorized access to the wireless network if it is determined that the client device has ceased attempting to gain the unauthorized access to the wireless network.

9. The method of claim 5 wherein determining when the client device attempts to gain unauthorized access to the wireless network includes determining whether the client device is successful in gaining unauthorized access to the wireless network, the method further including:
  providing information associated with the first approximate physical location to an interoperability and collaboration system, wherein the information identifies whether the client device is successful in gaining the unauthorized access to the wireless network.

10. An apparatus comprising:
  means for determining when a client device attempts to gain unauthorized access to a wireless network; located if it is determined that the client device attempts to gain unauthorized access to the wireless network;
  means for providing information associated with the first approximate physical location to a surveillance system, wherein the surveillance system is configured to observe at least the first approximate physical location;
  means for determining if the client device continues to be located at the first approximate physical location, wherein the means for determining if the client device continues to be located at the first approximate physical location include means for determining if the client device changes from attempting to gain unauthorized access to the wireless network through a first access point to attempting to gain unauthorized access to the wireless network through a second access point;
  means for identifying a second approximate physical location at which the client device is located if it is determined that the client device does not continue to be located at the first approximate physical location; and
  means for providing information associated with the second approximate physical location to the surveillance system, wherein the surveillance system is configured to observe at least the second approximate physical location.

11. The apparatus of claim 10 further including:
  means for observing at least the first approximate physical location using the surveillance system after the information associated with the first approximate physical location is provided to the surveillance system.

12. The apparatus of claim 11 wherein the surveillance system includes a plurality of monitoring devices and the apparatus further includes:
  means for identifying a first monitoring device of the plurality of monitoring devices as being suitable for observing the first approximate physical location.

13. The apparatus of claim 10 further including:
  means for determining if the client device has ceased attempting to gain the unauthorized access to the wireless network; and
  means for providing an indication to the surveillance system that the client device has ceased attempting to gain the unauthorized access to the wireless network if it is determined that the client device has ceased attempting to gain the unauthorized access to the wireless network.

14. The apparatus of claim 10 further including:
  means for providing information associated with the first approximate physical location to an interoperability and collaboration system.

15. Logic encoded in one or more tangible, non-transitory computer-readable media for execution and when executed operable to:
  determine when a client device attempts to gain unauthorized access to a wireless network;
  identify a first approximate physical location at which the client device is located if it is determined that the client device attempts to gain unauthorized access to the wireless network;
  provide information associated with the first approximate physical location to a surveillance system, wherein the surveillance system is configured to observe at least the first approximate physical location;

determine if the client device continues to be located at the first approximate physical location, wherein the logic operable to determine if the client device continues to be located at the first approximate physical location is further operable to determine if the client device changes from attempting to gain unauthorized access to the wireless network through a first access point to attempting to gain unauthorized access to the wireless network through a second access point;

identify a second approximate physical location at which the client device is located if it is determined that the client device does not continue to be located at the first approximate physical location; and the surveillance system, wherein the surveillance system is configured to observe at least the second approximate physical location.

16. The logic of claim 15, when executed, further operable to:

observe at least the first approximate physical location using the surveillance system after the information associated with the first approximate physical location is provided to the surveillance system.

17. The logic of claim 16 wherein the surveillance system includes a plurality of monitoring devices and the logic is further operable to:

identify a first monitoring device of the plurality of monitoring devices as being suitable for observing the first approximate physical location.

18. The logic of claim 15, when executed, further operable to:

determine if the client device has ceased attempting to gain the unauthorized access to the wireless network; and provide an indication to the surveillance system that the client device has ceased attempting to gain the unauthorized access to the wireless network if it is determined that the client device has ceased attempting to gain the unauthorized access to the wireless network.

19. The logic of claim 15, when executed, further operable to:

provide information associated with the first approximate physical location to an Internet Protocol interoperability and collaboration system.

20. An apparatus comprising:

an intrusion detection arrangement embodied on a tangible, non-transitory computer-readable medium, the intrusion detection arrangement being arranged to determine when a client without authorization attempts to access a wireless network, wherein the intrusion detection arrangement is associated with the wireless network; and a location identification arrangement embodied on a tangible, non-transitory computer-readable medium, the location identification arrangement being arranged to identify at least a first approximate physical location of the client without authorization when the client without authorization attempts to access the wireless network, wherein the location identification arrangement is configured to communicate the first approximate physical location to surveillance arrangement that is arranged to monitor the first approximate physical location, wherein the intrusion detection arrangement is further arranged to determine when the client without authorization has successfully accessed the wireless network, and wherein the location identification arrangement is further configured to communicate an indication to the surveillance arrangement that the client without authorization has successfully accessed the wireless network when it is determined that the client without authorization has successfully accessed the wireless network.

* * * * *